United States Patent [19]

Lundsager

[11] Patent Number: 4,900,698

[45] Date of Patent: Feb. 13, 1990

[54] CERAMIC PRODUCT AND PROCESS

[75] Inventor: Christian B. Lundsager, Ashton, Md.

[73] Assignee: W. R. Grace & Co.-Conn., New York, N.Y.

[21] Appl. No.: 54,470

[22] Filed: May 26, 1987

[51] Int. Cl.[4] .................... C04B 38/06; C04B 35/10; C04B 35/02

[52] U.S. Cl. ...................... 501/80; 501/81; 501/82; 501/94; 501/108; 501/109; 501/110; 501/123; 501/125; 501/127; 501/132; 501/133; 501/152; 501/153; 501/154; 264/63

[58] Field of Search .................... 501/127, 126, 80, 81, 501/82, 94, 108, 109, 110, 123, 125, 132, 133, 152, 153, 154; 264/63

[56] References Cited

U.S. PATENT DOCUMENTS

| | | | |
|---|---|---|---|
| 1,856,303 | 5/1932 | White | 501/128 |
| 2,741,822 | 4/1956 | Udy | 264/63 |
| 2,829,427 | 4/1958 | Tacvorian et al. | 501/127 |
| 3,097,421 | 7/1963 | Cronin | 501/127 |
| 3,148,981 | 9/1964 | Ryshkewitch | 501/127 |
| 3,184,306 | 5/1965 | Fish | 501/127 |
| 3,244,539 | 4/1966 | Hare | 501/127 |
| 3,351,495 | 11/1967 | Larsen et al. | 264/49 |
| 3,421,863 | 1/1969 | Bawa et al. | 501/128 |
| 3,526,485 | 9/1970 | Dawihl et al. | 501/127 |
| 3,706,583 | 12/1972 | Fletcher | 501/94 |
| 3,870,776 | 3/1975 | McMahon | 264/61 |
| 3,904,551 | 9/1975 | Lundsager et al. | 502/241 |
| 3,953,562 | 4/1976 | Hait et al. | 264/63 |
| 3,985,846 | 10/1976 | Lundsager et al. | 264/44 |
| 4,102,694 | 7/1978 | Sasaki et al. | 501/126 |
| 4,364,877 | 12/1982 | Clement et al. | 264/1.2 |
| 4,609,527 | 9/1986 | Rinderle et al. | 264/63 |
| 4,634,685 | 1/1987 | Pohl et al. | 501/127 |

FOREIGN PATENT DOCUMENTS

| | | | |
|---|---|---|---|
| 277981 | 9/1967 | Australia . | |
| 169067 | 1/1986 | European Pat. Off. . | |
| 1696685 | 11/1969 | Fed. Rep. of Germany | 501/126 |
| 54-008209 | 4/1979 | Japan | 501/127 |
| 55-115436 | 9/1980 | Japan . | |
| 487046 | 10/1975 | U.S.S.R. | 501/127 |
| 668682 | 3/1952 | United Kingdom | 501/127 |
| 679804 | 9/1952 | United Kingdom | 501/127 |
| 839326 | 6/1960 | United Kingdom | 501/127 |
| 1044502 | 10/1966 | United Kingdom . | |
| 1458961 | 12/1976 | United Kingdom . | |

*Primary Examiner*—Mark L. Bell
*Assistant Examiner*—Anthony J. Green
*Attorney, Agent, or Firm*—Edward J. Cabic

[57] ABSTRACT

Porous ceramic greenware comprising finely divided ceramic filler, finely divided metal, and polyolefin controls shrinkage in fired shape. In a preferred embodiment the metal and ceramic filler are bound together with the clean burning polyolefin and a plasticizer. After molding the mixture into the final shape, the plasticizer is removed to introduce porosity into the shaped article. Next the article is heated to decompose the polyolefin which can exit as a gas through the pore openings. Finally, the article is fired to a high temperature to oxidize the metal to metal oxide which becomes sintered with the ceramic filler particles to form a sintered porous article where the oxidized metal bonds the filler particles together in the desired shape.

38 Claims, No Drawings

CERAMIC PRODUCT AND PROCESS

This invention relates to the ceramics arts, and more particularly to the production of porous ceramic articles of predetermined net shape and improved strength.

An object of this invention is to reduce shrinkage of certain porous ceramic greenware when it is fired. Another object is to improve the strength of the fired article.

The greenware which is modified and improved by my invention is that formed by mixing a ceramic filler with a polyolefin and plasticizer. Such greenware is well-known in the art, and subsequent treatment is also well-known, viz., the product is treated to remove plasticizer (by extraction with a solvent or by heating), and then the resulting porous product is fired to burn off the polyolefin and to sinter the ceramic filler particles to make a porous ceramic product. See, for example, U.S. Pat. No. 3,904,551 for making a monolith of porous ceramic.

Simply stated, my invention in one embodiment is directed to an improvement of the aforesaid prior-art ceramic mix. I add a finely divided metal to such mix. Such addition provides shrinkage control and in most cases increases strength in the final porous product over that of a similar porous product made without the metal. The finely divided metal oxidizes under sintering conditions when air or pure oxygen is available in the surrounding atmosphere.

BACKGROUND OF THE INVENTION

U.S. Pat. No. 1,856,303 discloses a ceramic mix of 1-10% of a metal with bauxite, kaolin, and/or clay. The metal is finely divided and can be aluminum or magnesium, alone or as a mixture or alloy. Iron powder, ferroaluminum, and silicon are also mentioned. The metal is said to control shrinkage. The patent states that the metal, particularly aluminum powder, oxidizes below the vitrification point of the ceramic body. Other ceramic components include diaspore, gibbsite, sillimanite, cyanite, andalusite and mullite. The mix contains no polyolefin or plasticizer at any stage. The products differ from those of the instant invention.

U.S. Pat. No. 3,351,495 discloses preparation of a battery separator starting with a uniform mix of polyolefin, filler, and plasticizer. The filler can be carbon, black, coal dust, graphite; metal oxides and hydroxides such as those of Si, Al, Ca, Mg, Ba, Ti, Fe, Zn, and Sn; metal carbonates such as those of Ca and Mg; minerals such as mica, montmorillonite, kaolinite, attapulgite, asbestos, talc, diatomaceous earth and vermiculite; and a number of other salts and compounds. The mix contains no metal and is not fired.

U.S. Pat. No. 3,526,485 discloses sintered ceramic ware comprising alumina, zirconia, and/or beryllia, with dispersions of titanium and/or zirconium alloys. The metals improve resistance to thermal shock. The mix uses at least 5% metal and at least 65% ceramic oxide component. Dense non-porous bodies, such as cutting tool bits, are made by sintering in a reducing atmosphere or in a vacuum. The metals are not oxidized. The patent refers to prior art in which dispersions of iron, chromium, molybdenum, or tungsten were similarly used.

U.S. Pat. No. 3,706,583 discloses addition of tungsten or molybdenum particles to yttria-, magnesia-, or calcia-stabilized hafnia matrix to improve strength and shock resistance in the sintered body. The result is dense and nonporous. Sintering is done under vacuum, and the metal particles are not oxidized. No polyolefin or plasticizer is involved.

U.S. Pat. No. 3,904,551 discloses a process for making a porous ceramic monolith such as an auto exhaust catalytic converter. A three-component mix is used which comprises a ceramic component, a polymer, and a plasticizer. The ceramic component is a sinterable material such as alumina, spodumene, mullite, zircon mullite, magnesia-alumina, spinel, cordierite, and aluminum titanate. Cordierite is a preferred material and it has the formula $2MgO.2Al_2O_3.5SiO_2$. A plasticizer, such as mineral oil, is extracted with hexane, and a microporous structure is obtained. No metal is used in the mix.

U.S. Pat. No. 3,953,562 discloses stabilizing ceramic green sheets against dimensional changes by contacting the sheet with a solvent which softens the binder (which can be a thermoplastic polymer) in the ceramic green sheet and thereby permits relief of stress. The ceramic mix as such contains no metal, nor is the final product porous.

U.S. Pat. No. 4,364,877 teaches making a homogeneous mix of alumina plus a small amount of another oxide, with an organic binder, followed by firing in two steps, the first to remove the binder and the second to sinter the particles to make the frit. No metal is involved, and the product is dense and impervious, not porous.

Australian Pat. No. 277,981 discloses a three-component mix of polyolefin, ceramic filler, and plasticizer. The plasticizer can be extracted. No metals are disclosed, nor is the mix fired or otherwise heated.

British Pat. No. 1,044,502 discloses mixes of polyolefin, ceramic filler, metal (Al or Pb), and plasticizer to make film or filament. The plasticizer can be extracted with a solvent such as petroleum ether to give a porous film. Heating or firing is not taught.

British Pat. No. 1,438,961 discloses a three-component mix of olefin polymer, finely divided sinterable metal, and plasticizer. The plasticizer which is typically a hydrocarbon oil is extracted with a solvent such as hexane, then the structure is heated to remove most or all of the olefin polymer, and finally the structure is fired to sinter the metal particles. No ceramic materials are disclosed.

European Patent Appln. Pub. No. 0169067 (Lanxide Corp.), U.S.A. priorities of July 20, 1984 and June 25, 1985; and U.S. Pat. Nos. 3,870,776 and 3,953,562 teach conversion of molten aluminum to alumina with the aid of a catalyst in a pool of molten aluminum. Such a process is different from the present invention.

I am also aware that certain rocket fuel propellants comprise finely divided Al and ammonium perchlorate oxidant in polybutadiene binder. Such compositions, besides lacking my ceramic filler and plasticizer, would be totally unsuitable for the uses of my products, since they would ignite explosively on firing, leaving a dispersed powder of aluminum oxide.

Addition of aluminum powder to cold pressing powders for ceramic green bodies is known in the industry. This is done for the purpose of improving release from the die or mold, and addition is normally at the level of less than 1%. Such green bodies when fired yield nonporous ceramic shapes.

I am aware of a prior formulation prepared in the laboratories of the assignee of this invention, which contained, for example, 1.4 wt % polyethylene, 93.8 wt % lead, and 4.8 wt % mineral oil. The product was non-porous and was not fired. A metal-free mix was also formulated with lead oxides.

In firing greenware prepared as stated in U.S. Pat. No. 3,904,551, the product tends to shrink. The instant invention reduces such shrinkage by the addition of finely divided metal to the starting mix. X-ray examination shows that the added metal oxidizes substantially during firing. It is believed that the oxidizing of the metal causes expansion into the interstices between the particles of ceramic filler, thereby holding the filler particles apart and thus preventing shrinkage, while simultaneously the oxidizing metal causes bonding between the particles of the ceramic filler. In addition to contributing to bonding in the manner just described, the metal particles also help in the final definition of the pores or cavities of the fired structure. The greenware is, of course, already porous when it is placed in the kiln, because of the prior removal of plasticizer by leaching or by heating; this porosity is largely retained during firing. Also, additional porosity is created during firing by the combustion of polyolefin. Thirdly, during firing, the constituent metal particles may provide additional pores. The conventional, commercial variety of aluminum and other metal powders are made by an atomizing process which results in globular or spheroidal particles. When these materials are used in the present invention a unique type of porosity is obtained. When the greenware is fired, the spheroidal metal particles disappear and they are replaced in the sintered ware by spheroidal pores. These atomized-metal-generated pores are believed unique. So far as I can determine, such pores are not found in sintered ware fired from any other type of greenware.

These atomized-metal-generated pores are largely open pores, and they interconnect with adjoining pores or passageways throughout the porous structure. The atomized-metal-generated pores are roughly spheroidal or ellipsoidal in shape. Their uniqueness lies in the fact that the "skin" or boundary defining a given pore is made of extremely small metal oxide multifaceted grains, generally contiguous, and typically 0.2 to 3 microns in diameter. The skins of the atomized-metal-generated pores are what makes the pores different from prior art pores. These skins or boundary layers result when the greenware is fired, and form when the atomized metal particles oxidize. These unique metal-oxide-walled pores lie between the particles of ceramic filler and help to bond the ceramic particles. As already mentioned, there will be some oxidized metal not a constituent part of a pore skin or boundary, and this material will typically lie between ceramic particles and will also bond same. The atomized-metal-generated pores can vary in size and shape. A pore diameter in the range of 0.3 to 10 microns is typical. So far as I can determine, the structure that I have just described is novel. The structure is a sintered porous ceramic structure comprising open pores where the skins of the pores being made of minute grains of metal oxide, and where the pores lie in a matrix of porous ceramic filler with the interstices of the filler containing metal oxide. Typically, the filler itself is a metal oxide.

As regards the above mentioned atomized-metal-generated porosity, while I do not wish to be bound to any particular mechanism, I believe that this pore formation involves evaporation of the metal at temperatures below the melting point, possibly enhanced by the exotherm of oxidation, which takes place at that time on the surface of the metal particle. This metal vapor condenses on the surrounding ceramic filler particles, which do not contain metal and, therefore, are colder. As heating continues, this metal oxidizes and adds to the grains of ceramic, surrounding the metal particle. This process is believed to continue until the metal particle is consumed. The oxides formed on the surface of the metal particle during this process are believed to add to the ceramic grains, causing grain growth by a process well-known in ceramics, where, during sintering, smaller grains are absorbed onto larger grains. The end point of the process is when all the metal is consumed by either the evaporation-condensation-oxidation-sintering process or by the oxidation-sintering process, leaving a pore where the metal particle was, said pore being surrounded by a region of greater density than that of the average for the overall body. This mechanism probably applies regardless of the shape of the metal particles. However, in the case of atomized spheroidal metal particles, the pore is spheroidal and is lined with a skin of grains as previously described.

Unless otherwise stated, the metal powders used in the following examples are commercially available atomized varieties.

In all formulations herein contemplated, the oxide occupies a volume greater than the starting metal. Indeed, the theory as stated appears to be supported by experiments varying the starting metal/metal oxide ratio in the composition. By adjustment of this ratio, negative shrinkage can be obtained (i.e., actual expansion). At the other end of the scale, shrinkage can be permitted to reach nearly the values that would result using no metal, all by controlling the amount of metal in the formulation. These possibilities are shown in Table 1, below.

TABLE 1

| Formulation, wt % | Ex. 1 | Ex. 2 | Ex. 3 | Ex. 4 | Ex. 5 | Ex. 6 | Ex. 7 | Ex. 8 | Ex. 9 | Ex. 10 |
| --- | --- | --- | --- | --- | --- | --- | --- | --- | --- | --- |
| Polyethylene | 2.5 | 2.5 | 2.5 | 2.5 | 2.5 | 2.5 | 2.5 | 2.5 | 2.5 | 2.5 |
| Mineral Oil | 12.0 | 12.0 | 12.0 | 12.0 | 12.0 | 12.0 | 12.0 | 12.0 | 12.0 | 12.0 |
| $Al_2O_3$ | 85 | 84 | 83 | 81 | 77 | 69 | 65 | 61 | 59 | 57 |
| Al | 0 | 1 | 2 | 4 | 8 | 16 | 20 | 24 | 26 | 28 |
| Zn Stearate (lubricant) | 0.5 | 0.5 | 0.5 | 0.5 | 0.5 | 0.5 | 0.5 | 0.5 | 0.5 | 0.5 |
| Total wt. loss %[1] | 15.0 | 14.0 | 13.3 | 11.0 | 7.4 | 0.4 | 0.1 | −2.2 | 0.9 | 4.0 |
| Total Possible[2] | 14.5 | 13.6 | 12.7 | 10.5 | 7.4 | 0.3 | −3.3 | −6.9 | −8.7 | −10.4 |
| Firing Shrinkage, % | 15.5 | 15.1 | 15.0 | 11.5 | 11.5 | 7.0 | 0.5 | −4.8 | −2.4 | −2.6 |

[1] Extraction and firing weight loss.
[2] Assuming that all Al has been oxidized to $Al_2O_3$ To prepare the samples tested in Table 1, high molecular weight polyethylene, mineral oil, alumina, and powdered aluminum metal were blended in a laboratory mixer with a little zinc stearate lubricant. The homogenized mix was pressed into bars. These were extracted with hexane to remove a substantial part of the mineral oil plasticizer while retaining shape, and the bars were fired in a Teresco furnace at 1650° C. for two hours. In this and following tables and examples, negative weight loss or negative shrinkage indicates (as the case may be) that the sample actually gained weight or expanded, due to oxidation of the metal component.

As used herein, "homogenized" and "homogeneous" refer to thorough mixing or blending. After homogenization, the different particles can still be identified under the microscope. Throughout, unless otherwise stated, percentages are weight %; w/o means weight %; v/o means volume %; density is given as g/cm$^3$; temperatures are in degrees C.

In a preferred embodiment the mineral oil is removed by heating in a forced air oven overnight (16 hours) at 100° C. Removal by heating and removal by extraction give essentially the same results.

A preferred embodiment for the firing step is to fire more slowly than in Example 1. A preferred procedure is to fire 6 hours from room temperature to 610° C. which is below the 660° C. melting point of Al; hold at 610° C. for 6 hours, then heat 1 hour to 1450° C., and hold at 1450° C. for 2 hours. This yields a very good porous material with about 5% shrinkage.

The stated variations are generally applicable with a given oxide component. For example, one type of aluminum oxide may give one series of shrinkages. However, keeping all components constant, but switching to a different type of alumina may give slightly different shrinkages. This is shown in Table 2 below. In this study, two different types of alumina were examined. Both are commercially available powders and are known to produce quality ceramic products. Alumina A contains about 85% Al$_2$O$_3$, whereas Alumina B contains 95% Al$_2$O$_3$, the balance in the latter case comprising clay, talc and chromia. The compositions in Table 2 were molded to bars, ⅛"×⅜"×2"; plasticizer was removed by bake-out at 100° C. overnight in a forced-air oven; and the bars were fired 2 hours to 1600° C., held at that temperature 2 hours, then allowed to cool.

Table 3. My product is described in the last two columns; the commercial product (sintered at a temperature not known to me) is in the first column. As noted, flexural strength of my products was superior to that of the commercial product. Actually, I have made some porous ceramic products by the process of this invention with flexural strengths greater than 20,000 psi. I believe that the relative weakness of the commercial product is explained as a result of a lower sintering temperature, necessitated by the desire to retain porosity and by the lack of shrinkage-preventing (and porosity-preserving) metal of my invention.

TABLE 3

| Some Physical Properties of Porous Ceramic Materials | | | |
|---|---|---|---|
| | Commercial Filter[a] Ex. 19 | Fired at 1300° C. Ex. 20 | Fired at 1450° C. Ex. 21 |
| Pore diameter at distribution maximum (micrometer) | 2.3 | 0.52 | 1.0 |
| Width of pore size distribution (micrometer) | 0.9–3.8 | 0.09–1.0 | 0.15–1.4 |
| Open pore volume (cm$^3$/gm) | 0.110 | 0.134 | 0.130 |
| Bulk density (gm/cm$^3$) | 2.64 | 2.48 | 2.52 |
| Skeletal density (gm/cm$^3$) | 3.73 | 3.72 | 3.75 |
| Flexural strength (psi)[c] | 8150 ± 850 | 9800 ± 1600 | 11990 ± 1120 |

[a]Support section of the filter only.
[b]56.7 w/o commercial 93% Al$_2$O$_3$ powder; 28.3 w/o commercial Al powder, 325 mesh size; 3 w/o polyethylene; and 12 w/o mineral oil (Sunthene 255).
[c]By 3-point bend.

In further runs, low shrinkage results (2.3, 0.2%) using Al, versus 8.1% with no Al in the formulation, as shown in Table 4 below.

The procedure of Table 1 was followed. Bars ⅛" thick, ⅜" wide, ×2" long were tested.

TABLE 2

| Formulation, wt % | Alumina A | | | | Alumina B | | | |
|---|---|---|---|---|---|---|---|---|
| | Ex. 11 | Ex. 12 | Ex. 13 | Ex. 14 | Ex. 15 | Ex. 16 | Ex. 17 | Ex. 18 |
| Polyethylene | 2 | 2 | 2 | 2.5 | 2 | 2 | 2 | 2.5 |
| Mineral Oil | 13 | 10 | 8 | 10 | 13.0 | 10.0 | 8.0 | 10.0 |
| Al$_2$O$_3$ | 64.5 | 67.5 | 69.5 | 62.0 | 64.5 | 67.5 | 69.5 | 62.0 |
| Al | 20 | 20 | 20 | 25 | 20 | 20 | 20 | 25 |
| Zinc Stearate | 0.5 | 0.5 | 0.5 | 0.5 | 0.5 | 0.5 | 0.5 | 0.5 |
| Parameters | | | | | | | | |
| Total Combustible, % | 15 | 12 | 10 | 12.5 | 15 | 12 | 10 | 12.5 |
| Al/Al$_2$O$_3$ | 0.31 | 0.30 | 0.29 | 0.40 | 0.31 | 0.30 | 0.29 | 0.40 |
| Result | | | | | | | | |
| Shrinkage, % | 9.2 | 6.2 | 4.7 | 5.2 | −4.4 | −3.3 | −3.8 | −3.0 |

As shown in the data in Table 2, shrinkage with Alumina A can be brought into the range of 4–5%, whereas that of Alumina B can show negative shrinkage (i.e., actual expansion) of the order of 3–4%, all other factors being held constant. This is consistent with ceramics know-how, that different ceramic powders will show different shrinkage when fired under the same conditions. The presence of metal powder does not mask this difference.

As mentioned, inclusion of a metal in the polyolefin-ceramic filler-plasticizer formulation offers increased strength in the final sintered ceramic product. In this connection a porous filter blank was made by my process, for comparison with a similar commercial filter blank made without metal. The results are shown in

TABLE 4

| Component | Ex. 22 | Ex. 23 | Ex. 24 |
|---|---|---|---|
| Al$_2$O$_3$[1], w/o | 72.2 | 64.2 | 44.6 |
| Mineral Oil, w/o | 20.0 | 17.8 | 12.3 |
| Polyethylene w/o | 7.8 | 7.0 | 4.8 |
| Al Powder w/o | 0 | 11.0 | 38.3 |
| | 100.0 | 100.0 | 100.0 |
| Extraction loss w/o | 19.4 | 17.7 | 14.3 |
| Firing loss w/o (1200° C.) | 11.6 | −1.4 | −0.3 |
| Shrinkage, % | 8.1 | 2.3 | 0.2 |

[1]Contains CaO impurity.

The ceramic oxide filler need not be the oxide of the added metal. Using the procedure of Table 1, a mix containing Al and TiO$_2$ gives good results. See Table 5 below. (Linear shrinkage was not measured.) The result of firing under my conditions was the intended formation of aluminum titanate as verified by X-ray diffraction analysis.

TABLE 5[(1)]

| Aluminum Titanate (Example 25) | | | |
|---|---|---|---|
| Composition | w/o | g/cm$^3$ | v/o |
| TiO$_2$ | 42.8 | 4.6 | 18.1 |
| Al Powder | 28.9 | 2.7 | 20.8 |
| Polyethylene | 12.1 | 0.9 | 26.2 |
| Mineral Oil | 16.2 | 0.9 | 34.9 |
| Weight Losses, % of Original | | Expected | Experimental |
| Extraction | | 16.2 | 16.5 |
| Firing at 1200° C. | | −13.6 | −8.3 |
| Overall | | 2.6 | 8.2 |
| Volume Losses from Shrinkage, % of Original Volume Based on Exterior Dimensions | | Expected | Experimental |
| Extraction | | 34.9 | 11.5 |
| Firing | | 20.4 | 18.3 |
| Overall | | 55.3 | 29.8 |
| Porosity in Fired Sample | | 0 | 25.0 |
| | | 55.3 | 54.8 |

[(1)]See "Table 5 Explanation"

Table 5 Explanation

Entries in Table 5 are explained as follows, starting with weight losses Since mineral oil was originally 16.2 w/o, extraction should result in a substantially identical weight loss, as was indeed the case (16.5 w/o). On firing, polyethylene (12.1 w/o) is lost, but the Al oxidizes and gains weight by a factor of 89%, so that 28.9 w/o Al becomes (theoretically) 54.6 w/o Al$_2$O$_3$, for a gain of 54.6 minus 28.9=25.7%. The net theoretical weight change on firing is thus 25.7 minus 12.1=13.6. Since the change is a gain, the "loss" is negative, and the net theoretical weight change is reported as −13.6. Continuing this calculation, and basing results on the starting composition before extracting the oil, the theoretical weight change on firing would be (a) gain in weight from Al oxidation less (b) loss of extracted oil less (c) loss of polyethylene; i.e., 25.7 minus 16.2 minus 12.1, or 2.6, listed as "Overall" in the Table. Actual results are given in the "Experimental" column. As noted, differences from theory are believed due to incomplete oxidation of the Al; this would of course reduce weight gain, both on firing and overall.

Turning now to Volume Losses, the figure of 34.9 v/o is simply the volume occupied by the mineral oil, and is taken directly from the Composition section of the Table. In other wods, if the oil were extracted and the shape were then collapsed, a theoretical decrease in volume of 34.9% should result. Again theoretically, firing the extracted greenware should also show volume lost by burning off the polyethylene, plus volume gained by oxidation of Al. Now, polyethylene v/o in the starting mix was 26.2 (see "v/o" column). Volume gained from Al oxidation is calculated from densities of Al and Al$_2$O$_3$; thus, the density of Al is 2.7 g/cm$^3$, so 1 g Al occupies 1/2.7=0.37 cm$^3$, and is equivalent to 1.89 g Al$_2$O$_3$. The density of Al$_2$O$_3$ is 3.99, so 1 g Al on oxidation will occupy 1.89/3.99=0.474 cm$^3$. And 1 cm$^3$ of Al will theoretically yield 0.474/0.37=1.28 cm$^3$ Al$_2$O$_3$, and 20.8 v/o Al =20.8×1.28=26.6 v/o Al$_2$O$_3$, an increase of 26.6 minus 20.8=5.8 v/o. This increase is subtracted from the polyethylene burnoff loss of 26.2, for a net volume loss of 26.2 minus 5.8=20.4 v/o. This is added to 34.9 for a theoretical overall volume loss, based on the original volume, of 55.3 v/o. Comparable experimental values were 29.8 and 25.00, for a total shrinkage (external and porosity) of 54.8 v/o, which is in excellent agreement with theoretical (55.3 v/o).

Note particularly that shrinkage in firing (based on greenware dimensions) was 18.3 v/o. If the fired shape is considered as a cube, this is equivalent to a linear shrinkage of $\sqrt[3]{18.3}=2.6\%$, which is acceptable for most commercial uses.

As noted, this calculation assumes shrinkage to the extent of 55.3 v/o, and consequently assumes zero porosity in the fired sample. The latter condition of course does not actually occur; which is to say, the "Expected" calculations of shrinkage are given merely for the sake of comparison with actual experimental results. As noted, the final product is indeed highly porous. The experimental figure of 25.0 is the porosity created by the combined effect of extraction and firing.

Similar calculations can be made with other metals, plasticizers, and polymers. In the general case the volume of the ceramic filler remains constant throughout.

Assuming firing to result in a 100% dense ceramic body, Table 5 shows (inter alia) that with my material there may be some shrinkage, and when that is taken into account the residual "shrinkage" actually results in porosity. Or, if final porosity and total shrinkage are added, the total equals (54.8 or 55.3 as the case may be) the calculated volume loss from plasticizer and polymer less the expansion from Al→Al$_2$O$_3$.

Table 5 also shows that the metal and the oxide can differ as to metal.

A mix of oxides can be used as the ceramic filler. In Table 6 the mix contained Al$_2$O$_3$ and TiO$_2$ (plus Al, etc.). The material was pressed into tiles, the plasticizer extracted with hexane, and the greenware fired to 1600° C., resulting in a porous product and near-complete conversion to aluminum titanate. Note that the sample with Al shrank less (8.6%) than the sample with no Al.

TABLE 6

| | Aluminum Titanate | |
|---|---|---|
| Formulation, w/o | Example 26 | Example 27 |
| Al$_2$O$_3$ | 37.9 | 0 |
| TiO$_2$ | 29.6 | 36.1 |
| Al (metal powder) | 0 | 24.4 |
| Polyethylene | 10.8 | 13.2 |
| Mineral Oil | 21.6 | 26.4 |
| | 99.9 | 100.1 |
| Pressed and extracted tiles | | |
| Firing, °C. | 1600 | 1600 |
| Time, hrs. | 2 | 2 |
| Linear shrinkage, % | 19.0 | 8.6 |
| Color | pale green | white |

In the next run (Example 28) the composition consisted of (wt %): Al 38, Al$_2$O$_3$ 45, polyethylene 5, and mineral oil 12. The sample was fired with a 5-hour hold at 640° C. to allow time for the conversion of Al to Al$_2$O$_3$. The sample showed a remarkably sharp demarkation between completely converted (white) and "uncoverted" (black) areas on the top side with less distinction on the bottom, where less air is available. (The sample was supported on alumina "grog", i.e., coarse particles.) There are competing reactions taking place during firing: the polyethylene is burned off and the aluminum is oxidized, both processes consuming oxygen. The polyethylene is completely pyrolyzed at 530°

C., before the Al completes its oxidation. Both processes are exothermic.

A sample of the same starting composition was extracted with hexane to remove oil plasticizer, then fired at 1650° C. Shrinkage was zero; porosity was 38% by volume, measured by water absorption. (Example 29).

In another run (Example 30) the composition consisted of (wt %) Al 35, $Al_2O_3$ 41, polyethylene 5, and mineral oil 19. After blending the mix and pressing into 1/16" thick tiles, the oil was extracted with hexane, and firing proceeded in accord with the process of Example 1. Linear shrinkage was essentially zero. Porosity was 44% by volume. The fired specimen was white. It had exuded metal droplets to the surface, which is an indication of an oxygen deficiency in the furnace.

A series of Al-containing samples were heated at different heating rates to 1650° C. The results are shown in Table 7. Example 31 was taken to 1650° C. at about the fastest rate possible, in 2 hours. Example 34 was allowed 48 hours for the same temperature rise. The other samples were held at 900° C. and at 1650° C. for various times. In these runs there was no significant difference in linear shrinkage, which is negative, i.e., the samples grew in size. The porosity was about 40%. The bulk density was about 1.8 g/cm$^3$ and the skeletal density 3.0 g/cm$^3$, the latter suggesting some closed pores.

TABLE 7

| Sample | Heating Rates | | | |
|---|---|---|---|---|
| | Ex. 31 | Ex. 32 | Ex. 33 | Ex. 34 |
| Time to 900° C., hrs. | (a) | 1 | (a) | (a) |
| Time at 900° C., hrs. | 0 | 2 | 0 | 0 |
| Time to 1650° C., hrs. | 2 | 1 | 2 | 48 |
| Time at 1650° C., hrs. | 0 | 2 | 4 | 0 |
| Linear Shrinkage, % | −3.7 | −3.1 | −3.4 | −1.4 |
| Volume Porosity, % | 39 | 39 | 39 | 40 |
| Bulk Density, g/cm$^3$ | 1.70 | 1.74 | 1.88 | 1.79 |
| Skeletal Density, g/cm$^3$ | 2.8 | 2.9 | 3.1 | 3.0 |
| Formulation, w/o | | | | |
| $Al_2O_3$ | | 41.0 | | |
| Al | | 35.0 | | |
| Polyethylene | | 5.3 | | |
| Mineral Oil | | 18.7 | | |

Extraction wt. loss, 16.7%
(a)One heating rate only to 1650° C.

In another series of the same formulation as that of the preceding Table 7, samples were removed at successively higher temperatures from the kiln. All samples were started together. The color suggests that conversion of Al to alumina is not completed until the temperature is near 1600° C. The data are in Table 8, below.

TABLE 8

| Sample | Firing Sequence | | | |
|---|---|---|---|---|
| | Ex. 35 | Ex. 36 | Ex. 37 | Ex. 38 |
| Total time, hours(a) | 3 | 6 | 9 | 13 |
| Final Temp. °C. | 900 | 1100 | 1300 | 1600 |
| Time at final temp. hrs. | 1 | 1 | 1 | 2 |
| Color | gray | gray | lt. gray | white |
| Linear Shrinkage, % | −1.8 | −2.0 | −2.7 | −2.4 |
| Bulk Density, g/cm$^3$ | 1.56 | 1.62 | 1.58 | 1.79 |

(a)Cooling time not included.

Another formulation (Example 39) was (wt %): $Al_2O_3$ 45, Al 19, polyethylene 7, and mineral oil 29. This formulation was designed for negligible shrinkage at 1600° C. From this formulation were made small pieces of monoliths of spiral-wound ribbed sheets and stacked ribbed sheets in cross-flow pattern. (A cross-flow pattern means layers with the ribs placed 90° to the ribs in a previous layer. See U.S. Pat. No. 3,854,186.) The flat sheet configurations were fired with a weight on top; the spiral-wound structures were press-fit into a ceramic tube prior to firing. In all cases a bond was obtained between layers. In comparable runs omitting Al, no bond was possible owing to 10–15% linear shrinkage associated with firing. All pieces were porous, with 40% water pick-up, which indicated over 50% porosity. The actual firing shrinkage was estimated at 3%, which of course gave a very low level of stresses in the structure.

In two further examples, the following formulations were prepared, pressed into tiles, extracted, and fired 12 hours to 700° C., 12 hours hold, 1 hour to 1600° C., 2 hours hold, then cool.

| | Example 40 wt % | Example 41 wt % |
|---|---|---|
| Alumina(1) | 77 | 67 |
| Al | 10 | 20 |
| Polyethylene(2) | 3 | 3 |
| Mineral Oil(3) | 10 | 10 |

(1)95% $Al_2O_3$, balance $SiO_2$, chromia.
(2)High molecular weight, "FD 60018", from Allied Chemical Co.
(3)Sunthene 255, from Sun Oil Co.

Tiles of Example 40 (10% Al) and Example 41 (20% Al) showed 6% and −2% shrinkage respectively, suggesting that Al somewhere between 10 and 20% should give zero shrinkage.

The Al powder used in all examples (except as noted) was −325 mesh, but contains large-enough particles so that a molded tile has bright, metallic spots on the surface. To reduce the particle size, a dry blend (see formula, Table 9 below) was ball-milled overnight, then run in a Brabender mixer, hot for several hours, with air partially excluded, to prevent excess polymer degradation. After molding, the tiles still showed the bright metal spots. The fired tiles had negative shrinkage of 4%. One tile was refired, 20 hours to 1600° C. with 2 hours hold at 1600° C. The result was 2% shrinkage as a result of the second firing.

A comment about firing is appropriate here, and will help distinguish my compositions from those of the prior art. One would expect a porous ceramic body, when heated to normal sintering temperature, to "collapse" into a dense body. This is why prior art firings are so critical, both in heating rates, maximum temperature, and time at maximum temperature. In contrast, my materials appear substantially non-sensitive to such variations, which is to say, my process results in a novel porous ceramic body which essentially does not (a) collapse or (b) reduce its porosity (pore volume) or its external dimensions when reheated to its sintering temperature for one hour.

My process with or without refiring makes an excellent catalyst substrate. As shown in Table 9, the weight gain, 22%, in firing is close to the calculated 23% for full oxidation.

TABLE 9

| | Example 42 | | |
|---|---|---|---|
| | Weight, g | | |
| | Compound | Extraction | Oxidized |
| Polyethylene | 3 | 3 | 0 |
| Mineral Oil | 12 | 0 | 0 |
| Al Metal | 42.5 | 42.5 | $\frac{102}{54} \times 42.5 = 80.5$ |

TABLE 9-continued

Example 42

| | Weight, g | | |
|---|---|---|---|
| | Compound | Extraction | Oxidized |
| $Al_2O_3$ | 42.5 | 42.5 | 42.5 |
| | 100 | 88.0 | 123.0 |

Actual wt. gain 22.0%

In one embodiment the plasticizer is removed by baking in an oven a 100° C.; the residual plasticizer (if any) plus polyolefin is removed in the firing step. This is shown in Table 10 below.

TABLE 10

| | Bake-out and Firing | | | | | |
|---|---|---|---|---|---|---|
| | Ex. 43 | Ex. 44 | Ex. 45 | Ex. 46 | Ex. 47 | Ex. 48 |
| Bake-out at 100° C. | | | | | | |
| Time, hours | 0.5 | 1.0 | 2.0 | 4.0 | 6.5 | 22 |
| Weight loss, %[a] | 0.8 | 2.0 | 2.8 | 5.5 | 8.2 | 9.6 |
| Firing at 1600° C.[b] | | | | | | |
| Total wt. loss %[c] | 15.8 | 16.1 | 15.7 | 15.7 | 15.7 | 15.6 |
| Appearance after firing | | | | | | |
| Slump | yes | no | no | no | no | no |
| Blisters | yes | yes | yes | no | no | no |
| Cracks | no | no | no | yes | no | no |

[a]12% possible
[b]8 hours to 500° C., 4 hours to 1600° C., 2 hours at 1600° C., cool.
[c]Including that in bake-out.

EXAMPLE 49

Following the procedure of Example 1, tubes were made for certain applications requiring permeability. The tubes were 0.25-inch and 0.125-inch diameter porous alumina. A bubble pressure test indicated a maximum pore diameter of about 2 microns. The tubes were made from formulations of Al, 23 w/o, alumina 46 w/o, polyethylene 6 w/o, and mineral oil 25 w/o. The mix was extruded into tubes, the oil was extracted with hexane, and the tubes were fired for 5 hours to 1650° C., 2 hours hold.

Thickness of the Piece

The thickness of the piece influences the amount of oxidation of metal to metal oxide in the furnace, and this appears to be true whether the furnace is gas-fired or electric. In a formulation where the metal is Al and the ceramic filler is alumina, for complete oxidation I prefer a thickness not exceeding about ½-inch. Pieces thicker than this will still be oxidized to a reasonable depth, but may not be completely oxidized all the way through. Such incomplete oxidation is within the scope of the invention.

EXAMPLE 50

In this run, ⅛" bars were molded from (wt %) $Al_2O_3$ 54, Al 34, mineral oil 10, and high molecular weight polyethylene 2. The oil was extracted and the bars fired 8 hours to 620° C., 2 hours to 1450° C., 2 hours hold, then cool. Shrinkage from mold to fired porous ceramic was 3%, a very low value.

Table 11 tabulates the mercury porosimetry on products sintered at different temperatures for 2 hours. The mix consisted of (wt %) $Al_2O_3$ 56, polyethylene 4.9, mineral oil 20.4, and Al 18.7.

TABLE 11

Mercury Porosimetry Results on Composition Sintered at Different Temperatures for 2 Hrs.

| Example | Sintering Temp. (°C.) | Skeletal Density (gm/cm³) | Intrusion Pore Volume (cm³/gm) | Pore Size at Distribution Maximum (micrometer) |
|---|---|---|---|---|
| 51 | 1450 | 3.68 | 0.21 | 0.20 |
| 52 | 1500 | 3.70 | 0.18 | 0.20 |
| 53 | 1550 | 3.70 | 0.15 | 0.20–0.26 |
| 54 | 1600 | 3.66 | 0.14 | 0.20 |
| 55 | 1650 | 3.63 | 0.08 | 0.20 |

As previously discussed, skeletal density was not substantially affected by increase in firing temperature; indeed, it decreased slightly at 1600° C. and 1650° C.

My experiments show that higher conversion (higher degree of oxidation) results when samples are put in a kiln which is preheated. In this regard, a series of 3 additional firings were conducted, each with a set of bars like Examples 6 through 10 in Table 1. In each case, the kiln was preheated, and the sample bars, on a cold sagger plate, were inserted into the hot kiln, which was then further heated to 1650° C. in one hour, held at this temperature for another 2 hours, and then allowed to cool. Table 12 gives results of these firings. Preheating of the kiln to 600° C. gives a better result than preheating to 650° C. (above the melting point of Al). This appears to confirm that critical parts of the reaction as discussed above, take place below the melting point of the metal (at least in the case of Al).

TABLE 12

| | Kiln Preheating | | | | |
|---|---|---|---|---|---|
| | Sample Color, Outside/Inside[a] | | | | |
| | Ex. 56 | Ex. 57 | Ex. 58 | Ex. 59 | Ex. 60 |
| Al, w/o | 16 | 20 | 24 | 26 | 28 |
| Preheat °C. | | | | | |
| Room temp. | p/p | p/g[b] | g/g | g/g | g/g |
| 500 | p/p | p/g | p/g | g/g | g/g |
| 600 | p/p | p/p | p/p | g/g | p/p |
| 650[c] | p/p | g/g | g/g | g/g | g/g |

[a]p: all pink; g: gray dominant, some pink. (The pink color is due to a small amount of chromium in this commercial alumina powder.)
[b]Samples closest to zero shrinkage are underlined.
[c]Above the MP of alumina (640° C.).

EXAMPLE 61

| Component | Wt % |
|---|---|
| Alumina[1] | 56.7 |
| Al[2] | 28.3 |
| Polyethylene[3] | 3.0 |
| Mineral Oil | 12.0 |

[1]Commercially available as Alcoa "A-12"
[2]Atomized Al powder, commercially available as Alcan A-105.
[3]Available from Allied Chemical Co. as "FD-60018".
[4]"Sunthene 255" from Sun Oil Co.

The composition was blended, shaped into 20 mil-thick sheet, cut to 1" discs, the oil extracted with hexane, and the discs fired at 1450° C. for 2 hours. A micrograph of the as-fired surface showed an extremely uniform microsurface, with an average pore diameter of about 1 micron.

Through a number of trials it was found that the pore size in the final sintered material could be made to vary from 1.0 to 0.3 microns. Different types of Al and alumina may give slightly different results. The results of this study are summarized in Table 13. The composition used in Table 13 are given in Table 14.

TABLE 13

Mercury Porosimetry Characterization of Porous Support Materials
(For compositions see Table 14)

| Example | Firing Temperature (°C.) for 2 hours | Open Pore Volume (cm³/gm) | Bulk Density (cm³/gm) | Skeletal Density (cm³/gm) | Pore Diameter at Distribution Maximum (μm) | Width of Pore Distribution (μm) |
|---|---|---|---|---|---|---|
| 62 | 1600 | .065 ± .005 | 2.98 ± .01 | 3.70 ± 0.5 | 1.0 | 1.8–0.4 |
| 63-(a) | 1450 | 0.178 | 2.10 | 3.34 | 0.3 | 0.5–0.06 |
| 63-(b) | 1500 | 0.105 | 2.57 | 3.50 | 0.34 | 0.5–0.12 |
| 63-(c) | 1550 | 0.082 | 2.71 | 3.47 | 0.34 | 0.5–0.12 |
| 63-(d) | 1600 | 0.060 | 2.85 | 3.44 | 0.3 | 0.5–0.10 |
| 63-(e) | 1650 | 0.024 | 3.08 | 3.32 | No Useful Pores | |
| 64 | 1600 | 0.078 | 2.61 | 3.28 | 0.5 | 1.0–0.15 |
| 65-(a) | 1450 | 0.216 | 1.99 | 3.49 | 0.4 | 0.6–0.09 |
| 65-(b) | 1500 | 0.169 | 2.24 | 3.59 | 0.4 | 0.6–0.12 |
| 65-(c) | 1550 | 0.144 | 2.37 | 3.60 | 0.4 | 0.6–0.18 |
| 65-(d) | 1600 | 0.114 | 2.55 | 3.59 | 0.4 | 0.6–0.18 |
| 65-(e) | 1650 | 0.069 | 2.92 | 3.55 | 0.4 | 0.6–0.15 |
| 66 | 1600 | 0.117 | 2.56 | 3.64 | 0.4 | 0.6–0.18 |
| 67-(a) | 1450 | 0.220 | 2.05 | 3.74 | 0.4 | 0.6–0.10 |
| 67-(b) | 1500 | 0.184 | 2.20 | 3.70 | 0.4 | 0.6–0.18 |
| 67-(c) | 1600 | 0.136 | 2.45 | 3.66 | 0.4 | 0.6–0.18 |
| 67-(d) | 1650 | 0.084 | 2.78 | 3.63 | 0.4 | 0.6–0.18 |
| 68-(a) | 1450 | 0.249 | 1.90 | 3.61 | 0.32 | 0.5–0.1 |
| 68-(b) | 1500 | 0.217 | 2.07 | 3.76 | 0.4 | 0.6–0.1 |
| 68-(c) | 1550 | 0.189 | 2.20 | 3.77 | 0.4 | 0.6–0.12 |
| 68-(d) | 1600 | 0.125 | 2.51 | 3.65 | 0.4 | 0.6–0.16 |
| 68-(e) | 1650 | 0.123 | 2.54 | 3.69 | 0.4 | 0.6–0.16 |

TABLE 14

Starting Composition of Materials Fired in Table 13

| Composition, Example | Alumina[1] | Alumina[2] | Alumina[3] | Al[4] | Al[5] | Al[6] | Polyethylene[7] | Mineral Oil[8] |
|---|---|---|---|---|---|---|---|---|
| 62 | 57 | 0 | 0 | 28 | 0 | 0 | 3 | 12 |
| 63-(a–d) | 0 | 46 | 0 | 0 | 23 | 0 | 6 | 25 |
| 64 | 0 | 46 | 0 | 23 | 0 | 0 | 6 | 25 |
| 65-(a–e) | 0 | 46 | 0 | 0 | 23 | 0 | 6 | 25 |
| 66 | 0 | 46 | 0 | 0 | 0 | 23 | 6 | 25 |
| 67-(a–d) | 0 | 46 | 0 | 0 | 23 | 0 | 6 | 25 |
| 68-(a–e) | 0 | 0 | 46 | 0 | 23 | 0 | 6 | 25 |

[1]95% Al$_2$O$_3$
[2]"Alcoa Al6 SG", with 2 w/o MgO, 2 w/o SiO$_2$
[3]"Baikowski CRO.1", with 0.5 w/o MgO
[4]"Valimet H5"
[5]"Alcan 105"
[6]"Alcan 1401"
[7]High molecular weight
[8]"Sunthene 255"

Additional porosity data are given in Table 15. The data in Tables 13 and 15 indicate utility of the sintered products as microfilters.

TABLE 15

Mercury Porosimetry Characterization of Porous Support Materials

| Example | Firing Temp. (°C.) for 2 hrs. | Open Pore Volume (cm³/gm) | Bulk Density (cm³/gm) | Skeletal Density (cm³/gm) | Pore Diameter at Distribution Maximum (micrometer) | Width of Pore Distribution (micrometer) |
|---|---|---|---|---|---|---|
| 69-(a) | 900 | 0.152 | 2.32 | 3.60 | Two maxima at 0.4 and 0.02 | 0.6–0.006 |
| 69-(b) | 1300 | 0.134 | 2.48 | 3.72 | 0.52 | 1.0–0.09 |
| 69-(c) | 1450 | 0.130 | 2.52 | 3.75 | 1.0 | 1.4–0.15 |

TABLE 15-continued

| | | Mercury Porosimetry Characterization of Porous Support Materials | | | | |
|---|---|---|---|---|---|---|
| Example | Firing Temp. (°C.) for 2 hrs. | Open Pore Volume (cm³/gm) | Bulk Density (cm³/gm) | Skeletal Density (cm³/gm) | Pore Diameter at Distribution Maximum (micrometer) | Width of Pore Distribution (micrometer) |
| 69-(d) | 1600 | 0.096 | 2.82 | 3.87 | 1.05 | 1.8–0.15 |
| 70-(a) | 1300 | 0.267 | 1.906 | 3.89 | 0.24 | 0.5–0.05 |
| 70-(b) | 1450 | 0.129 | 2.63 | 3.97 | 0.25 | 0.4–0.10 |

69-(a-d): 56.7 w/o alumina, 28.3 w/o aluminum, 3 w/o polyethylene, 12 w/o mineral oil.
70-(a-b): 46 w/o alumina, 23 w/o aluminum, 3 w/o polyethylene, 12 w/o mineral oil.

Compositions in Table 16 followed a known commercial composition, except that in Examples 72 and 73 20% Al metal was included. The compositions of Examples 71 and 74 were identical (no Al) as were the compositions of Examples 72 and 73 (20% Al). All ingredients except the polyethylene were ball milled with excess oil overnight, and the excess oil separated by decanting followed by vacuum filtration. It was found that when the mixture was heated to about 100° C., the filtercake contained at least about 12% oil, adequate for comparative testing.

Following filtration, the polyethylene was added to the mixture which was then compounded hot and compression molded to bars and tiles. These were subjected to bake-out at two different temperatures, first at 100° C., then for Examples 73 and 74 only at 250° C. The bake-out weight losses show that the actual oil content may have been higher than 12%, at least in Examples 73 and 74. The weight loss after 250° C. bake-out reflects additional loss from polymerdegradation.

The samples were fired to 1650° C. in one hour, but the two Examples 73 and 74 were taken through the temperature range around the melting point of aluminum, 600°–700° C., slowly over a two-hour period. All samples, cold, were put into the kiln at 600° C. Firing shrinkage, total from mold dimensions, was less for the samples containing aluminum, and less at the more complete bake-out for Example 73. An increase in strength could not be demonstrated by the use of Al in these runs, which were directed at obtaining maximum density. The slightly lower strength (MOR or Modulus of Rupture as measured in 3-point bending similar to ASTM 689-80) would be expected for samples which contain porosity.

TABLE 16

| Ball Milled Alumina with and without Al Metal | | | | |
|---|---|---|---|---|
| Formulation, % by weight | Ex. 71 | Ex. 72 | Ex. 73 | Ex. 74 |
| Alumina | 78.4 | 60.0 | 60.0 | 78.4 |
| Fluorspar | 1.7 | 1.3 | 1.3 | 1.7 |
| Chrome oxide | 0.9 | 0.7 | 0.7 | 0.9 |
| Jackson clay | 3.0 | 2.2 | 2.2 | 3.0 |
| Yellowstone talc | 1.0 | 0.8 | 0.8 | 1.0 |
| Subtotal | 85.0 | 60.0 | 60.0 | 85.0 |
| Aluminum | 0.0 | 20.0 | 20.0 | 0.0 |
| Mineral oil | 12.0 | 12.0 | 12.0 | 12.0 |
| Polyethylene | 2.5 | 2.5 | 2.5 | 2.5 |
| Zn stearate | 0.5 | 0.5 | 0.5 | 0.5 |
| Total | 100 | 100 | 100 | 100 |
| Process | | | | |
| Bake-out, °C. | 100 | 100 | 250 | 250 |
| 600 to 700° C., hours | 0.1 | 0.1 | 2.0 | 2.0 |
| 700 to 1650° C., hours | 1.0 | 1.0 | 1.0 | 1.0 |
| Results | | | | |
| Bake-out wt. loss, % | 12 | 12 | 17 | 17 |
| Linear shrinkage, % | 14.6 | 12.8 | 11.7 | 14.4 |
| Archimedes density, gm/cm³ | 3.561 | 3.496 | 3.508 | 3.560 |
| Pore vol., % | 0 | 5.7 | 4.9 | 0 |
| 3 pt. MOR, kpsi | 58 | 52 | 47 | 61 |
| Std. dev. % | 17 | 12 | 13 | 20 |
| Number of specimens | 14 | 12 | 19 | 12 |

The Metal Component

Substantially any metal or combination of metals is useful which can be prepared in finely divided solid form and which will oxidize at kiln temperatures. For example, Al, Zn, Fe and Cu have been successfully used and it is expected that Si, Ti, Mg, Ba, Ta, U, Cr, Co, V, Mn, Ni, Sn, Zr, Th, Ge, and the rare earth metals are also considered operable because they are known to form oxides readily and it is expected that Tl, Pb, Mo and W would also be operable although Tl and Pb are low melters and Mo and W form volatile oxides.

All metals do not oxidize with equal ease and low melting metals may melt before sufficient oxide scale forms on each particle to retain the melt within the particle. In this case the temperature is held below the melting point for an extended time and provisions are made for adequate oxygen supply. The problem with these low melting materials is that puddling of the metal to larger droplets of molten metal may effectively prevent complete oxidation. One solution to the problem is to add metal oxide powders which can prevent such puddling. Other solutions are to provide an adequate oxygen supply and to use fine particle size metal. The fine particles have two advantages. They have higher surface area which makes oxidation take place more readily and they are less likely to have their oxide shell burst than are larger particles.

Certain metal oxides such as WO and MoO are volatile below the melting point of the metals. In such cases, oxidation can be furthered by raising the oxygen pressure and by maintaining the oxidation temperature at below the volatilization temperature of the metal oxide.

The metal is finely divided, typically 98% passing a 325 mesh screen, so as to permit ready dispersion in the blend.

The Ceramic Filler Component

These are all inorganic, since they must survive kiln temperatures. Useful fillers include oxides of the metals listed above. For example, $TiO_2$, $SiO_2$ and $Al_2O_3$ have been successfully used. These filler particles are basically inert and thus there is no criticality in their selection. It is expected that the metal oxides of Zn, Fe, Mg, U, Zr, Sn, Co, V and Cr would especially be useful. Combinations of metal oxides can be used to form ceramic components in situ. Thus, alumina and $TiO_2$ can be fired at 1600° C. with formation of aluminum titanate, $Al_2TiO_5$. (Cf. Table 6.) Another combination is $Al_2O_3$ and $SiO_2$, to give mullite (aluminum silicate, $3Al_2O_3.2SiO_2$). Naturally occurring refractory minerals may be included, e.g., clay, talc, vermiculite, fluorspar, and the like. (See Table 16.)

It is not necessary that the ceramic component be a compound of the metal component. In certain cases, if the ceramic filler component is not completely oxidized at the outset (i.e., when the greenware is placed in the kiln), it may oxidize further during the sintering process, with concomitant volume change.

The Binder System

The binder system is preferably a polymer system which is capable of being volatilized away when the composition is heated in the presence of air or oxygen. The binder can be just a polymer alone or a combination of a polymer and a plasticizer. In the combination embodiment the polymer is preferably present from 1 to 15 wt. % of the total composition and the plasticizer is present from 3 to 60 wt. % of the composition.

The Polymer Component

Polymers suitable for purposes of this invention include materials which are fluid at some stage in their processing and which are substantially non-solvents for the ceramic material. Suitable thermoplastics for carrying out this invention include: unplasticized polyvinyl chloride, polyvinyl chloride-propylene copolymer, polyvinyl chloride-ethylene copolymers, polyvinylidene chloride copolymers, polystyrene, impact styrene, ABS resin, styrene butadiene block copolymers, polyethylene low (0.91 sp. gr.) to high density (0.965 sp. gr.), polyethylene copolymers with propylene, butene, 1-pentane, 1-octane, hexene, styrene, etc., polyethylene copolymers with vinyl acetate, alkyl acrylate, sodium acrylate, acrylic acid, etc., chlorinated polyethylene, chlorosulfonated polyethylene, polypropylene and propylene-olefin copolymers, polybutene and butylene-olefin copolymers, poly 4-methyl 1-pentene, thermoplastic polyurethanes, polyamides, e.g. Nylon 5, Nylon 12, Nylon 6/6, Nylon 6/10, Nylon 11, fluorocarbon resins such as FEP, polyvinylidene fluoride, polychlorotrifluoroethylene; acrylonitrile-methyl acrylate copolymers, acrylonitrile - vinyl chloride copolymers, methacrylonitrile-styrene copolymers, polymethyl methacrylate, cellulose acetate, cellulose acetate butyrate, acetal, polycarbonate, polysulfone, polyphenylene oxide, polyethylene and butylene terephthates.

Many thermosetting resins and crosslinkable resins are also suitable for purposes of this invention and include the following: radiation cured polyethylene, peroxide-cured polyethylene, diazo crosslinked polypropylene, epoxy resins; hydrocarbon, chloroprene, and nitrile rubbers, furane, melamine-formaldehyde, urea-formaldehyde, phenol-formaldehyde, diallyl phthalate, polyesters and silicones.

From economic considerations, one wishes to use relatively inexpensive binder polymers since they will be burned away in the final product. A preferred group of polymers are polyolefins, polyvinyl chlorides, polyvinyl acetates, polystyrenes and any mixture of these polymers.

The Plasticizer Component

The plasticizer component can be that used in prior art mixes, e.g., as described in U.S. Pat. Nos. 3,904,551 and 3,351,495, bearing in mind that some plasticizers will react violently with finely divided Al, e.g., the lower alcohols, and that these should, of course, be avoided. A particularly useful plasticizer is mineral oil. Hydrocarbons, e.g., paraffin oil and low polymers such as polyisobutylene and polybutadiene are suitable.

The plasticizer makes possible processing of the composition, i.e., it lowers the melt viscosity or reduces the amount of power input which is required to compound and fabricate the composition. Very importantly, the plasticizer, by its removal, inparts porosity to the composition and increases its viscosity so that slumping during the initial part of the firing is eliminated, thereby providing greenware suitable for firing, in that it retains its shape and combustion products from the polyolefin or other polymer and residual amounts of plasticizer can escape through the pores.

It not otherwise identified herein, the preferred plasticizer used in the example herein is a mineral oil, e.g., Sunthene 255 or Gulf mineral oil.

The Polyolefin Component

The preferred polyolefin component is the same as that used in mixes of the prior art, e.g., as described in U.S. Pat. Nos. 3,351,495 and 3,904,551. Thus, the polyolefin (which may be a mixture) has a high molecular weight (at least 100,000). Suitably it is a linear polyethylene of at least 0.93 to 0.97 g/cm³ density; high molecular weight polypropylene; or high molecular weight particle form ethylene-butylene co-polymer. Others are polybutene, ethylene-propylene co-polymers, ethylene-butene copolymers, propylene-butene copolymers, and ethylene-propylene-butene copolymers. A useful polyolefin is a commercial particle form high molecular weight polyethylene having a standard load (2,160 g.) melt index of 0.0; a high load (21,600 g.) melt index of 1.8, a density of 0.96, and a solution viscosity of 4.0 measured as 0.02 gram of polymer in 100 g. decalin at 130° C.

Blends of high and low molecular weight polyolefins can be used, bearing in mind that as the average molecular weight is reduced, the possibility of distortion (slumping) is increased during the bake-out and early part of the firing process.

If not otherwise identified, the polyolefin component is FD 60-018 polyethylene, available commercially from Allied Chemical Corp. An excellent alternate is an ultra-high molecular weight linear polyethylene available as "GUR-412" from American Hoechst Corp.; its molecular weight exceeds 1 million.

Miscellaneous Additives

It is conventional to add stabilizers (antioxidants) and lubricants when fabricating polyolefin-containing materials. Such additives and the amounts and manner of their use are well-known in the art. Representative of the stabilizers are 4,4 thiobis (6-tert-butyl-m-cresol) ("Santonox") and 2,6-di-tert-butyl-4-methylphenol ("Ionol"). Stabilizers are burnt off during firing. Zinc stearate is a preferred lubricant, and is used in a 0.5% concentration in many of the examples herein as an aid to give good dispersion of the solids in the polymer-plasticizer dispersion during compounding.

The Compounding Operation

Mixing is suitably carried out in conventional mixers such as a Banbury or Brabender mixer. When continuous compounding is desirable the use of intermeshing twin screw compounders is desirable. An example is the MP compounder manufactured by Baker Perkins Co. and the ZSK compounder manufactured by Werner and Pfleiderer. Acceptable compounds have also been made by multiple passes through conventional single screw thermoplastics extruders.

The Shaping Operation

The product of the compounding step is typically pellets or granules suitable as feedstock in various standard thermoplastics forming processes such as compression molding, extrusion, injection molding and a combination of these and mechanical shaping methods. For instance, a sheet can be extruded, which afterwards is stamped, punched, or cut into shapes. The general idea is that the material is shaped into final form prior to firing. Any material waste from these forming processes can be recycled for recovery. In the case of continuous forming operations, this can be combined with the compounding operation, when continuous compounding equipment is used.

Firing

The porous green body (greenware) can be heated in a conventional furnace such as an electrical or gas-fired kiln. In either type, means for adding air or oxygen is recommended, owing to the requirement that the metal component is substantially fully oxidized if shrinkage is to be reduced in the sintered ware. The kiln should, of course, be capable of achieving a temperature high enough for reasonably rapid oxidation of the metal component and for sintering the final product. The term "green body" or "greenware" is meant to be simply the product as it is placed in the kiln. Because oxidation of metals is generally exothermic, there can be problems in maintaining the sample at a constant temperature. Also when firing large pieces or when there are large kiln loadings there may be problems in providing an adequate oxygen supply and accordingly these conditions may require special controls of the firing process.

The Compositions

The invention compositions include the following:
(1) The homogeneous blend consisting essentially of (weight %):
 (a) metal, 5–90
 (b) ceramic filler, 5–90
 (c) polyolefin, 1–15
 (d) plasticizer, 3–60.
The components are selected within the above ranges so that they total 100%. Within the above ranges, preferred ranges are (weight %):
 (a) metal, 15–40
 (b) ceramic filler, 40–70
 (c) polyolefin, 2–10
 (d) plasticizer, 8–30.
Preferably the metal is aluminum, the ceramic filler is alumina, the polyolefin is particle form high molecular weight polyethylene having a standard load melt index of 0.0 g/10 minutes and a density of about 0.96 g/cm$^3$, and the plasticizer is mineral oil. A preferred weight ratio of metal to ceramic filler is about 1 to 2–4. With Al and Al$_2$O$_3$, 1 to 2.5–3 is preferred.

(2) Porous green body, resulting from molding, shaping, or the like, of the blend in (1), and removal of a substantial part of the plasticizer, as by extraction, baking or volatilization, and consisting essentially of (besides minor amounts of unremoved plasticizer), in parts by weight:
 (a) metal, 5–90
 (b) ceramic filler, 5–90, and
 (c) polyolefin, 1–15.
The composition of the porous green body is, of course, identical to the corresponding composition in (1), save for removal of a substantial part of the plasticizer. At least traces of plasticizer nearly always remain after extraction or "bake-out". These small amounts are completely removed in firing (along with the polyolefin). On a percent basis, the amounts of metal, ceramic filler, and polyolefin in the porous greenware are increased to the extent that plasticizer has been removed from the starting mix. In defining these quantities, it is more accurate to state them in parts by weight. Residual plasticizer, if any, does not affect the essential nature of the resulting greenware, and the amount is small enough to be ignored for the practical operation of the invention.

(3) Sintered porous ceramic body, consisting essentially of reaction product of metal, ceramic filler, and oxygen, with or without residual unreacted metal, in which the pores are essentially open and interconnecting. Some of the pores (not all) are derived from metal particles; which is to say, such metal-derived pores are where the metal particles were before firing. In the case where the metal particle is spheroidal (e.g., when the particle is formed by atomizing the molten metal—as is the general case), these metal-derived pores are often spheroidal and are defined by skins of metal oxide grains. Also, metal oxide lies in the interstices of the filler particles and bonds the filler particles and/or becomes a part of the metal oxide; e.g., the metal oxide may react with the filler particles, cf. aluminum titanate, Example 25. The diameter of atomized metal-derived pores lies typically in the range of 0.3 to 10 microns. Some such pores are of course larger, some are smaller, and not all such pores are open. The diameter of the metal oxide grains constituting the skin or shell of such pores is typically in the range 0.1 to 10 microns. The pore volume of the sintered porous body is in the range of about 5–60 volume %. Pore volumes of 25–50 volume % are typical.

In the oxidation of Al ($2Al + 1\frac{1}{2}O_2 = Al_2O_3$) during firing, the particles of Al may nearly double in weight. (The theoretical weight increase is 89%.) This weight gain is not always achieved, since the metal may not be completely pure, and also (more frequently) the oxidation is not complete, and/or some metal may be lost by evaporation. The objects of the invention are nevertheless achieved. In defining the finished sintered article, the ratio of starting ceramc filler to oxidized metal resulting from the starting metal particles can be at least approximately stated. This value follows from the amounts of ceramic and metal in the porous greenware, and derives directly from the starting homogeneous mix. Thus, in a preferred formulation, wherethe green body comprises 15–40 parts by weight metal (Al) and 40–70 parts by weight ceramic filler (alumina), the metal may nearly double in weight during firing, so as to provide about 28–75 parts by weight of alumina from metal, and the 40–70 parts of starting alumina remaining. In the finished fired product, the weight ratio of alumina formed as oxidized metal, to alumina originally present as ceramic filler is thus respectively 28–75 to 40–70. The preferred ratios for metals and ceramics other than Al and alumina can be calculated in the sam way. For example, for Zn, the weight increase (assuming complete oxidation) is 19.6%, and 15–40 parts of Zn give about 18–48 parts of ZnO. The weight ratios of oxidized metal to ceramic filler in the final sintered article would therefor be about 18–48 to 40–70. Ratios for other metals and ceramic fillers can be calculated in the same way.

Uses

The final fired porous shaped ceramic articles of this invention have properties that make them useful in many fields, and for many finished and semi-finished articles, including:

| | |
|---|---|
| Microfilters | Hollow fibers |
| Catalyst monoliths | Electronic substrates |
| Catalyst pellets | Turbine rotors and blades |
| Tubes | Brick |
| Cylinder linings | Valve seats |
| Piston tops | Thermal insulation |

What is claimed is:

1. Homogeneous precursor composition for forming a sintered porous ceramic article comprising
    (a) 5 to 90 wt. % of a finely divided solid metal capable of forming an oxide by heating in air and selected from the group consisting of Al, Zn, Fe, Cu, Si, Ti, Mg, Ba, Ta, U, Cr, Co, V, Mn, Ni, Sn, Zr, Th, Ge, Tl, Pb, Mo, W, the rare earth metals and mixtures thereof,
    (b) 5 to 90 wt. % of a finely divided ceramic filler which is an oxide of a metal selected from the group listed in part (a), and
    (c) remainder of a particle binding effective amount of a nonaqueous polymer binder system which is capable of being removed when the composition is heated in the pressure of air or oxygen, said binder being present in at least 4% by weight of the composition and comprising a mixture of
        (1) a polymer which is capable of being oxidized away when the composition is heated and
        (2) a plasticizer for the polymer.

2. Composition according to claim 1 in which the ceramic filler is an oxide of the metal in (a).

3. Composition according to claim 1 in which the metal of (a) is a member of the group consisting of Al, Zn, Fe, Cu, Si, Ti, Mg, Ba, Ta, U, Cr, Co, V, Mn, Ni, Sn, Zr, Th, Ge, the rare earth metals and mixtures thereof.

4. Composition according to claim 1 in which the metal of (a) is a member of the group consisting of Tl, Pb, Mo, W and mixtures thereof.

5. Composition according to claim 1, wherein
    (c) the polymer is present from 1 to 15 wt. % of the composition; and
    (d) the plasticizer is present from 3 to 60 wt. % of the composition.

6. Composition according to claim 5, wherein the polymer is selected from the group consisting of polyolefin, polyvinyl chloride, polyvinyl acetate, polystyrene and mixtures thereof.

7. Composition according to claim 6, wherein the polymer is a polyolefin.

8. Composition according to claim 7 in which the ceramic filler is an oxide of the metal in (a).

9. Composition according to claim 7 in which the metal of (a) is a member of the group consisting of Al, Zn, Cu, Fe, Si, Ti, Mg, Ba, Ta, U, Cr, Co, V, Mn, Ni, Sn, Zr, Th, Ge, the rare earth metals and mixtures thereof.

10. Composition according to claim 7 in which the metal of (a) is a member of the group consisting of Tl, Pb, Mo, W and mixtures thereof.

11. Composition according to claim 9 in which the metal is Al.

12. Composition according to claim 9 in which the metal is in the form of atomized spheroids.

13. Composition according to claim 11 in which the ceramic filler is alumina.

14. Composition according to claim 11 in which the ceramic filler is titania.

15. Composition according to claim 11 in which the ceramic filler is a mixture of alumina and titania.

16. Composition according to claim 7 in which the plasticizer is a mineral oil.

17. Composition according to claim 13 in which the polyolefin is a linear polyethylene having a molecular weight of at least 100,000.

18. Composition according to claim 13 in which the metal is 15–40, the ceramic filler is 40–70, the polyolefin is 2–10, and the plasticizer is 8–30 wt %.

19. Composition according to claim 18 in which the metal is atomized Al; the ceramic filler is alumina; the polyolefin is a linear polyethylene having a molecular weight of at least 100,000; and the plasticizer is mineral oil.

20. Homogeneous porous greenware composition consisting essentially of, in parts by weight:
    (a) 5 to 90 of a finely divided solid metal capable of forming an oxide by heating in air and selected from the group consisting of Al, Zn, Fe, Cu, Si, Ti, Mg, Ba, Ta, U, Cr, Co, V, Mn, Ni, Sn, Zr, Th, Ge, Tl, Pb, Mo, W, the rare earth metals and mixtures thereof;
    (b) 5 to 90 of a finely divided ceramic filler which is an oxide of a metal selected from the group listed in part (a); and
    (c) 1 to 15 of a binder comprising a polymer which is capable of being oxidized away when the composition is heated, said binder previously having contained a plasticizer which has been essentially removed to create the porous greenware composition.

21. Composition according to claim 20, in which the binder is a polyolefin.

22. Composition according to claim 21 in which the metal is 15–40, the ceramic filler is 40–70, and the polyolefin is 2–10 parts by weight.

23. Composition according to claim 22 in which the metal is in the form of atomized spheroids.

24. Composition according to claim 23 in which the metal is Al, the ceramic filler is alumina, and the polyolefin is linear polyethylene having a molecular weight of at least 100,000.

25. Sintered porous ceramic article consisting essentially of particles of ceramic filler having oxidized metal in the interstices thereof and bonding the filler particles, said article having been made from a mixture of metal particles selected from the group consisting of Al, Zn, Fe, Cu, Si, Ti, Mg, B, Ta, U, Cr, Co, v, Mn, Ni, Sn, Zr, Th, Ge, Tl, Pb, Mo, W, the rare earth metals and mixtures thereof and ceramic filler particles which are oxides of metals selected from the group listed above and characterized by the substantial conversion of the metal particles over a period of time to form said oxidized metal with substantially no unoxidized metal remaining.

26. Article according to claim 25 in which the ceramic filler is alumina and the oxidized metal is Al.

27. Article according to claim 26 in which the weight ratio of oxidized Al to ceramic filler alumina is about 28–75 to 40–70.

28. Article according to claim 25, selected from the group consisting of microfilters, catalyst monoliths, catalyst pellets, tubes, hollow fibers, electronic substrates, turbine rotors, turbine blades, cylinder linings, piston tops, valve seats, and bricks.

29. Process comprising firing greenware which is a porous homogeneous mixture consisting essentially of, in parts by weight:
   (a) 5 to 90 of a finely divided solid metal capable of forming an oxide by heating in air and selected from the group consisting of Al, Zn, Fe, Cu, Si, Ti, Mg, Ba, Ta, U, Cr, Co, V, Mn, Ni, Sn, Zr, Th, Ge, Tl, Pb, Mo, W, the rare earth metals and mixtures thereof;
   (b) 5 to 90 of a finely divided ceramic filler which is an oxide of a metal selected from the group listed in part (a); and
   (c) 1 to 15 of a binder comprising a polymer which is capable of being oxidized away when the composition is heated, said binder previously having contained a plasticizer which has been essentially removed to create the porous greenware composition.

30. Process according to claim 29, in which the binder is a polyolefin.

31. Process according to claim 30 in which the metal is 15–40, the ceramic filler is 40–70, and the polyolefin is 2–10 parts by weight.

32. Process according to claim 31 in which the metal is in the form of atomized spheroids.

33. Process according to claim 32 in which the metal is Al, the ceramic filler is alumina, and the polyolefin is particle form linear polyethylene having a molecular weight of at least 100,000.

34. Process according to claim 33 in which the firing is carried out in the following steps: about 6 hours increasing from room temperature to about 610° C., hold at about 610° C. for about 6 hours, then heat for about 1 hour to about 1450° C., and hold at about 1450° C. for about 2 hours.

35. Process comprising:
   (1) forming a homogenous composition consisting essentially of:
      (a) 5 to 90 wt. % of a finely divided solid metal capable of forming an oxide by heating in air and selected from the group consisting of Al, Zn, Fe, Cu, Si, Ti, Mg, Ba, Ta, U, Cr, Co, V, Mn, Ni, Sn, Zr, Th, Ge, Tl, Pb, Mo, W, the rare earth metals and mixtures thereof,
      (b) 5 to 90 wt. % of a finely divided ceramic filler which is an oxide of a metal selected from the group listed in part (a),
      (c) 3 to 60 wt. % of a plasticizer, and
      (d) 1 to 15 wt. % of a polyolefin;
   (2) forming the composition of (1) into a desired shape;
   (3) removing most of the plasticizer from the shape thereby to form porous greenware; and
   (4) firing the greenware, thereby to remove polyolefin and any residual plasticizer, to sinter the ceramic filler, and to oxidize substantially all the metal.

36. Process according to claim 35 in which the metal is in the form of atomized spheroids.

37. Process according to claim 35 in which in step (1) in weight % the metal is Al 15–40, the ceramic filler is alumina 40–70, the plasticizer is mineral oil 8–30, and the polyolefin is 2–10 and is particle form high molecular weight linear polyethylene having a molecular weight of at least 100,000.

38. Process according to claim 37 in which the firing is carried out in the following steps: 6 hours increasing from room temperature to 610° C., hold at 610° C. for 6 hours, then heat in 1 hour to 1450° C., and hold at 1450° C. for 2 hours.

* * * * *